US009613268B2

(12) United States Patent
Conboy et al.

(10) Patent No.: US 9,613,268 B2
(45) Date of Patent: Apr. 4, 2017

(54) PROCESSING OF IMAGES DURING ASSESSMENT OF SUITABILITY OF BOOKS FOR CONVERSION TO AUDIO FORMAT (71) Applicant: Google Inc., Mountain View, CA (US)

(72) Inventors: Garth Conboy, La Jolla, CA (US); Michael Salomon Morton, Lyme, NH (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 14/920,122

(22) Filed: Oct. 22, 2015

(65) Prior Publication Data

US 2016/0042230 A1 Feb. 11, 2016

Related U.S. Application Data (63) Continuation of application No. 13/749,535, filed on Jan. 24, 2013, now Pat. No. 9,202,142.

(51) Int. Cl.
G06K 9/00 (2006.01)
G06K 9/62 (2006.01)
G06K 9/03 (2006.01)
G10L 13/00 (2006.01)

(52) U.S. Cl.
CPC ......... G06K 9/00456 (2013.01); G06K 9/036 (2013.01); G06K 9/6267 (2013.01); G10L 13/00 (2013.01); G06K 2209/01 (2013.01)

(58) Field of Classification Search
None
See application file for complete search history.

(56) References Cited

U.S. PATENT DOCUMENTS

| 6,507,838 | B1* | 1/2003 | Syeda-Mahmood | G06F 17/30746 |
| 7,672,543 | B2 | 3/2010 | Hull et al. | |
| 7,720,835 | B2 | 5/2010 | Ward et al. | |
| 7,920,759 | B2 | 4/2011 | Hull et al. | |
| 8,494,900 | B2 | 7/2013 | Axe et al. | |
| 2009/0089293 | A1 | 4/2009 | Garritano et al. | |
| 2010/0205663 | A1 | 8/2010 | Ward et al. | |
| 2012/0179752 | A1 | 7/2012 | Mosley et al. | |
| 2014/0146053 | A1* | 5/2014 | Cragun | G06F 17/30247 345/467 |

(Continued)

OTHER PUBLICATIONS

U.S. Appl. No. 61/350,965, filed Jun. 3, 2010, 61 pages.

Primary Examiner — Tsung-Yin Tsai
(74) Attorney, Agent, or Firm — Fenwick & West LLP (57) ABSTRACT A system to process graphical elements within a book during assessment of the book for suitability for conversion to an audio format includes an image classification subsystem, an image processing subsystem, and a weighting subsystem. The image classification subsystem is configured to classify a graphical element based on at least one of a context of the graphical element and properties of the graphical element. The image processing subsystem is configured process the graphical element to create a processed graphical element, the processing responsive to the classification of the graphical element. The weighting subsystem is configured to produce a weighting corresponding to the processed graphical element, the weighting indicating an impact of the graphical element of suitability of the book for conversion to the audio format.

20 Claims, 6 Drawing Sheets (56) References Cited

U.S. PATENT DOCUMENTS

2014/0161356 A1* 6/2014 Tesch ................... H04L 51/063
 382/196
2014/0164915 A1* 6/2014 Liu ...................... G06F 17/211
 715/249
2016/0042230 A1* 2/2016 Conboy ............... G06K 9/6267
 382/224

* cited by examiner

PROCESSING OF IMAGES DURING ASSESSMENT OF SUITABILITY OF BOOKS FOR CONVERSION TO AUDIO FORMAT

CROSS REFERENCE TO RELATED APPLICATIONS

This application is a continuation of U.S. application Ser. No. 13/749,535, filed Jan. 24, 2013, which is incorporated herein by reference in its entirety.

BACKGROUND

1. Technical Field

The subject matter described herein generally relates to the field of electronic media and, more particularly, to systems and methods for determining suitability of a particular book for conversion to an audio book.

2. Background Information

Electronic book readers, implemented on special-purpose devices as well as on conventional desktop, laptop and hand-held computers, have become commonplace. Usage of such readers has accelerated dramatically in recent years. Electronic book readers provide the convenience of having numerous books available on a single device, and also allow different devices to be used for reading in different situations.

Electronic books are available not only in conventional text/graphic form for visual reading, but also in audio form. Many readers prefer reading a book in a traditional manner (i.e., viewing it in visual form) but would also like to progress through the book at times when traditional reading may not be feasible, such as when commuting to work while driving an automobile. Other readers may find it advantageous to listen to a book (or audio from a lecture) and follow along as needed in the text version of the book (or, correspondingly, a text transcript of the lecture).

The benefits of enjoying an audio book version of any particular book vary widely based on the nature of the book. For instance, consider a comic book. For many readers the experience of an audio version of such a book would be unsatisfactory, as the visual elements and the juxtaposition between the graphical and textual elements of the book are important to the overall reading experience. Similarly, an atlas, a geography book, a pictorial history, or a photography guide may exemplify books for which audio versions would not be well received. It would be advantageous to extend the benefits of electronic book technology further, for instance to automatically determine a suitability metric for converting a book into audio form.

SUMMARY

A system to process graphical elements within a book during assessment of the book for suitability for conversion to an audio format includes an image classification subsystem, an image processing subsystem, and a weighting subsystem. The image classification subsystem is configured to classify a graphical element based on at least one of a context of the graphical element and properties of the graphical element. The image processing subsystem is configured process the graphical element to create a processed graphical element, the processing responsive to the classification of the graphical element. The weighting subsystem is configured to produce a weighting corresponding to the processed graphical element, the weighting indicating an impact of the graphical element of suitability of the book for conversion to the audio format.

In one aspect, the image processing system creates the processed graphical element by replacing the graphical element with corresponding text responsive to the classification of the graphical element indicating the graphical element corresponds to text. In some instances, the corresponding text is based on the context of the graphical element.

In another aspect, where the graphical element is a symbol without a corresponding Unicode character, the image processing subsystem identifies a nature of the symbol and the processing of the graphical element is based on the nature of the symbol.

In a further aspect, where the image processing subsystem determines that the graphical element contains recognizable text, the image processing subsystem extracts the recognizable text from the graphical element and replaces the graphical element with the extracted text responsive to an amount of the recognizable text exceeding a threshold.

In yet further aspects, where the image classification subsystem classifies a second graphical element as a dingbat, the weighting subsystem applies a weighting of zero to the second graphical element. In various such aspects, the classification of the second graphical element as a dingbat is based on at least one of: a pixel area of the second graphical element; repetition of the dingbat throughout the book; a degree of complexity of the second graphical element; and recognition of the second graphical element as a dingbat by an OCR engine.

Related methods and computer-readable storage media storing corresponding instructions are also disclosed herein.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Electronic Book System Overview

Figure 1:
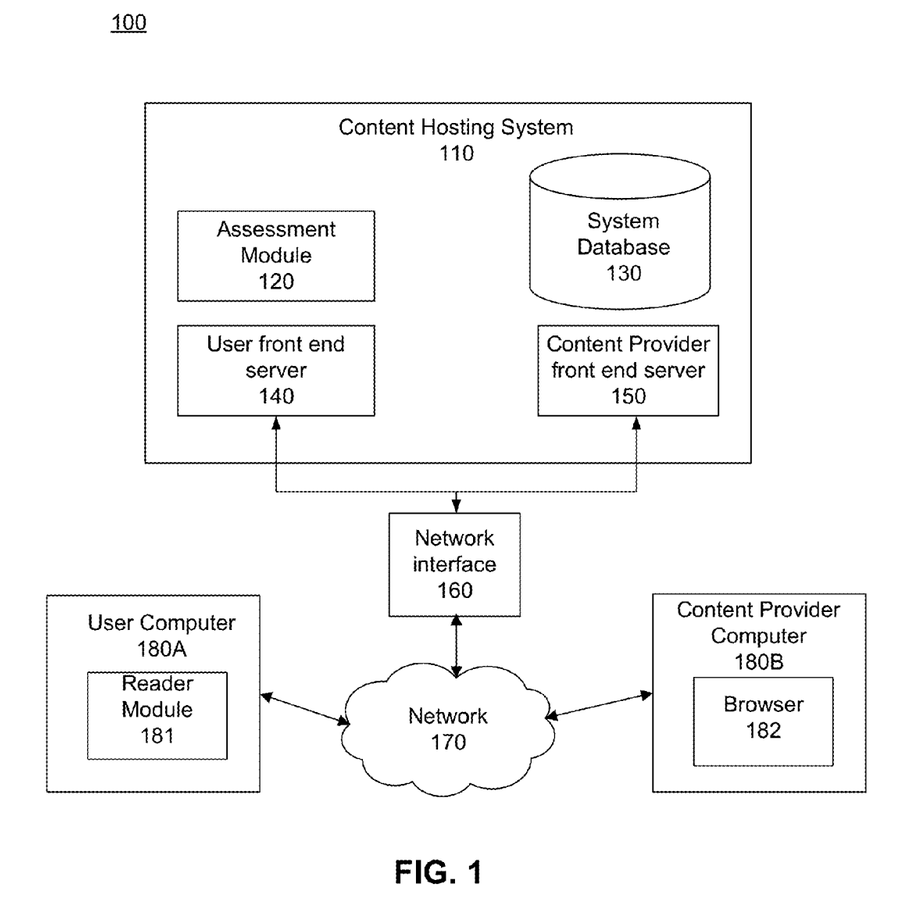
FIG. 1 is a high-level diagram illustrating a networked environment that includes an assessment module.

FIG. 1 is a high-level diagram illustrating a networked environment 100 that includes a content hosting system 110. The content hosting system 110 makes available for purchase, licensing, rental or subscription books that can be viewed on user and content provider computers 180 (depicted in FIG. 1, for exemplary purposes only, as individual computers 180A and 180B) using a reader module 181 or browser 182. The content hosting system 110 and computers 180 are connected by a network 170 such as a local area network or the Internet. As further detailed herein, the content hosting system 110 includes audio and text-based versions of an electronic book for the user to access via user computer 180A, as well as subsystems to provide synchronization information for each such version.

The network 170 is typically the Internet, but can be any network, including but not limited to any combination of a LAN, a MAN, a WAN, a mobile, a wired or wireless network, a private network, or a virtual private network. The content hosting system 110 is connected to the network 170 through a network interface 160.

Only a single user computer 180A is shown in FIG. 1, but in practice there are many (e.g., millions of) user computers 180A that can communicate with and use the content hosting system 110. Similarly, only a single content provider computer 180B is shown, but in practice there are many (e.g., thousands or even millions of) content provider computers 180B that can provide books and related materials for content hosting system 110. In some embodiments, reader module 181 and browser 182 include a content player (e.g., FLASH™ from Adobe Systems, Inc.), or any other player adapted for the content file formats used by the content hosting system 110. In a typical embodiment, user computers 180A and content provider computers 180B are implemented with various computing devices, ranging from desktop personal computers to tablet computers, dedicated book reader devices, and smartphones.

User computer 180A with reader module 181 is used by end users to purchase or otherwise obtain, and access, materials provided by the content hosting system 110. Content provider computer 180B is used by content providers (e.g., individual authors, publishing houses) to create and provide material for the content hosting system 110. A given computer can be both a client computer 180A and content provider computer 180B, depending on its usage. The hosting service 110 may differentiate between content providers and users in this instance based on which front end server is used to connect to the content hosting system 110, user logon information, or other factors.

The content hosting system 110 comprises a user front end server 140 and a content provider front end server 150, each of which can be implemented as one or more server class computers. The content provider front end server 150 is connected through the network 170 to content provider computer 180B. The content provider front end server 150 provides an interface for content providers—whether traditional book publishers or individual self-publishing authors—to create and manage materials they would like to make available to users. The user front end server 140 is connected through the network 170 to client computer 180A. The user front end server 140 provides an interface for users to access material created by content providers. In some embodiments, connections from network 170 to other devices (e.g., client computer 180A) are persistent, while in other cases they are not, and information such as reading progress data is transmitted to other components of system 110 only episodically (i.e., when connections are active).

The content hosting system 110 is implemented by a network of server class computers that can in some embodiments include one or more high-performance CPUs and 1 gigabyte or more of main memory, as well as storage ranging from hundreds of gigabytes to petabytes. An operating system such as LINUX is typically used. The operations of the content hosting system 110, user front end server 140 and content provider front end server 150 as described herein can be controlled through either hardware (e.g., dedicated computing devices or daughter-boards in general purpose computers), or through computer programs installed in computer storage on the servers of the system 110 and executed by the processors of such servers to perform the functions described herein. More detail regarding implementation of such machines is provided in connection with FIG. 4. One of skill in the art of system engineering and, for example, media content hosting will readily determine from the functional and algorithmic descriptions herein the construction and operation of such computer programs and hardware systems.

The content hosting system 110 further comprises a system database 130 that is communicatively coupled to the network 170. The system database 130 stores data related to the content hosting system 110 along with user and system usage information and, in some embodiments, provides related processing (e.g., the assessment functions described herein).

The system database 130 can be implemented as any device or combination of devices capable of storing data in computer readable storage media, such as a hard disk drive, RAM, a writable compact disk (CD) or DVD, a solid-state memory device, or other optical/magnetic storage mediums. Other types of computer-readable storage mediums can be used, and it is expected that as new storage mediums are developed in the future, they can be configured in accordance with the descriptions set forth above.

The content hosting system 110 is further comprised of an assessment module 120. The assessment module 120 is implemented as part of the content hosting system 110 in conjunction with the components listed above. The assessment module 120 provides a mechanism by which the system determines the relative suitability of audio conversion for books. In some embodiments, a user, via reader module 181, can direct operation of assessment module 120, for instance in embodiments in which conversion of a visual version of a book to an audio version can be accomplished upon user request. Given the wide range of possible operation of system 100, in some embodiments it may be desirable to limit such conversion to be performed by content providers themselves. Still, in some embodiments users, via reader module 181, may request conversion of any particular book, and if sufficient demand is thus identified, a content provider may determine to assess a book for suitability using the system. Feedback may be provided in a similar manner, suggesting particular details of how audio conversion is desired by users. As a specific example, aggregated data regarding user preference for audio or text-based versions of various books may be used to determine rankings for genres of books, voice actors narrating books, incentives for use of various types of reading devices that favor text-based or audio versions, etc. In a typical embodiment, the user is provided with various options regarding the information collected and processed as described herein, and the user (or parents, teachers, etc. for younger users) can opt not to have certain information about the user collected or used, if the user would rather not provide such information. The assessment functions described herein are in some embodiments implemented directly via content hosting system 110, while in other embodiments the functions performed by assessment module 120 may be partially or fully distributed to other devices, e.g., user computer 180A.

Figure 4:
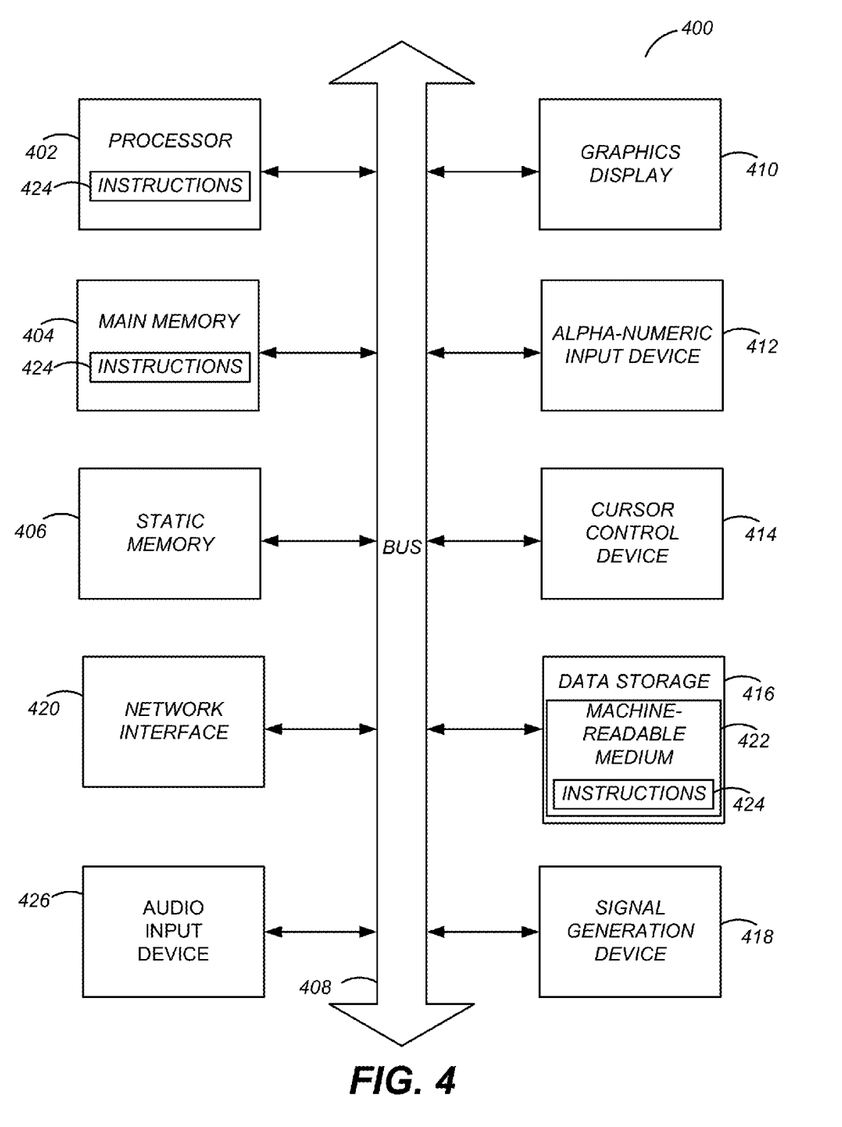
FIG. 4 illustrates one embodiment of components of an example machine able to read instructions from a machine-readable medium and execute them in a processor.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the content hosting system 110. Alternatively, hardware or software modules may be stored elsewhere within the content hosting system 110. The content hosting system 110 includes hardware elements necessary for the operations described here, including one or more processors, high speed memory, hard disk storage and backup, network interfaces and protocols, input devices for data entry, and output devices for display, printing, or other presentations of data. FIG. 4 provides further details regarding such components.

Numerous variations from the system architecture of the illustrated content hosting system 110 are possible. The components of the system 110 and their respective functionalities can be combined or redistributed. For example, the system database 130, assessment module 120, user front end server 140, and content provider front end server 150 can be distributed among any number of devices. The following sections describe in greater detail the assessment module 120, system database 130, and the other components illustrated in FIG. 1, and explain their operation in the context of the content hosting system 110.

Assessment Module

Figure 2:
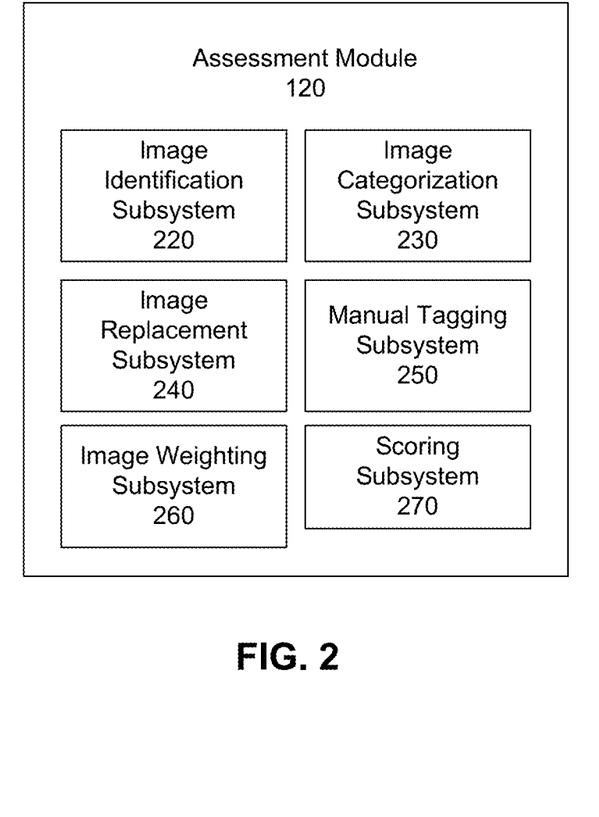
FIG. 2 illustrates a logical view of an assessment module used as part of an electronic book reader.

FIG. 2 illustrates a functional view of an assessment module 120 used as part of a electronic book system. In the embodiment described above in connection with FIG. 1, the assessment module 120 is implemented on content hosting system 110, but it should be recognized that in other embodiments, portions discussed herein could also be implemented on other computers (e.g., user computer 180A) that are in communication with content hosting system 110.

Assessment module 120 is configured, in the aspects discussed herein, to address the audio conversion assessment features detailed below. As described below, some of these features are interactive and may involve connections to other modules and applications. The features discussed below are social and collaborative as well. For example, while it is typical for only one person to read a text-based version of a book, multiple people (e.g., those in a carpool) might listen to a single audio version of the same book simultaneously, so some customized parameters that might be single-reader centric for a visual version of a book may be more appropriate to process based on plural listeners for an audio version.

Assessment module 120 includes various subsystems to facilitate these specialized uses. In the embodiment illustrated in FIG. 2, assessment module 181 includes an image identification subsystem 220, an image categorization subsystem 230, an image replacement subsystem 240, a manual tagging subsystem 250, an image weighting subsystem 260, and a scoring subsystem 270. Many of these subsystems interact with one another, as described below.

Image identification subsystem 220 provides a mechanism for identifying where in a visual version of a book the text elements are and where non-text elements (e.g., graphics or other images) are. In some embodiments, this subsystem also includes conventional optical character recognition (OCR) capabilities to readily process a traditional (i.e., print) book via scanning Such OCR processing allows conversion of text portions to a form that can be processed by a text-to-speech converter, and also identifies portions that such OCR engines might have difficulty recognizing. Such image identification is important to determine suitability of a book for text conversion, since in some instances graphics will include some areas with recognizable text (e.g., a picture of a person holding a newspaper). Indeed, comic books and graphical novels may well have such characteristics. In some embodiments, sections of a book that include only small areas of text with many surrounding areas that are not identifiable as text are flagged for manual review, for instance by tagging such areas as ambiguous. In a particular embodiment of this sort, not only are such areas tagged as ambiguous, but image identification subsystem 220 provides a proposed type for the area in question (e.g., photograph, line drawing, graph) and a confidence level, and this information is used downstream to determine the nature of any further review, or weighting, of each such area.

In other instances, the starting point may not be a scanned traditional print book, but instead an electronic book. Consider first a fixed-layout book, consisting of text and images with instructions for how each should be arranged. For such a book, processing to determine text and image portions is straightforward and consists merely of processing the instructions to determine which data corresponds to text and which data corresponds to images. The second example is a flowing book, in which the layout depends on the type of device upon which it is to be viewed. Again, however, identification of images is straightforward, and is complicated only by the additional coding to enable device-specific display.

In one embodiment, image identification subsystem 220 is configured to accept various formats of OCR engine output files and electronic book files. For example, the EPUB standard promulgated by the International Digital Publishing Forum (IDPF) includes support for both fixed layout and reflowable content presentation of electronic books, and in some embodiments assessment module 120 is configured to accept electronic books in such EPUB and other standard formats.

In any case, image identification subsystem 220 is configured to provide as output an stream of text corresponding to the areas identified as being textual and a collection of images, as well as some indication of where on a page each item is supposed to go.

Image categorization subsystem 230 next processes the images by putting them into various categories, as follows. In some embodiments, images that do not have any impact on creation of an audio version are identified and categorized so that they can be ignored and not processed further. For example, images on the front or back cover of a book are treated in this manner, as are images in the frontispiece and author photos. These are identified based on placement within the stream and, in some embodiments, by page numbers as well. Where page numbers are stored as images (e.g., due to use of highly stylized fonts), they are ignored for presentation purposes, even though metadata regarding pagination may be maintained for purposes of synchronization of audio and visual versions of the book, for triggering display of select images as discussed below, and the like. Even where page numbers are presented as text, either via optical character recognition or by examination of electronic book content, such page numbers are in many environments ignored for purposes of audio conversion assessment.

Likewise ignored are background colors, which may apply particularly for electronic books. These are identified in one embodiment by having a combination of large pixel size ("footprint" on the display) yet having very small compressed size.

Still another graphic that can be ignored for purposes of assessment is a dingbat—a graphic used as a stylistic element such as adjacent to the page numbers of the book. In various embodiments, such dingbats are recognized based on one or more of the following: having a small pixel area (since dingbats are more likely to be small images); high repetition throughout the book, indicating use on every page, alternating pages, or every chapter heading, for instance; simplicity, as dingbats are typically monochrome and have rather large solid portions; and recognition as a dingbat by the OCR engine, which may recognize the dingbat with a corresponding Unicode character. In one embodiment, special processing is undertaken to recognize Gaiji, which are special characters that have no particular Unicode correspondence, and to process those in an appropriate manner—some Gaiji may have relevance to text-to-audio conversion while others may not. Processing for related symbols, such as emoticons and the similar Japanese Emoji, are likewise handled based on the nature of the symbol.

A second category of image is one that actually corresponds with text. For instance, it is quite common for book chapters to begin with a single, stylized capital letter, sometimes in an illuminated manuscript style. Often these are recognized (for print books) or generated (for electronic books) as images rather than text characters. Image categorization subsystem 230 recognizes these images as relating to text and sends them, along with surrounding text that may be relevant, to image replacement subsystem 240. Image replacement subsystem 240 then substitutes the corresponding character(s) with text and performs processing as necessary to combine that text with surrounding text (e.g., to form a complete first word of a chapter from an image of a leading character and the remaining text of the word).

In addition to leading characters, some non-text characters are often embedded in the text of modern books, and these are similarly processed by image categorization subsystem 230 and image replacement subsystem 240. In one embodiment, the operation of image replacement subsystem 240 is context dependent. For example, a symbol of a heart (such as the icon ♥) may appear in two different contexts. In the sentence, "Have a ♥!" it is appropriately converted to the word "heart" but in the sentence, "I ♥ you!" it is appropriately converted to "love."

Still another example, mentioned above, is an image area that itself contains recognizable text. Where the amount of recognizable text in an image is above a certain threshold amount, image replacement subsystem 240 appropriately replaces the image with the OCR'ed text.

Manual tagging subsystem 250 provides a user interface to allow an operator, for instance a user of content provider computer 180B, to look at areas that were flagged as ambiguous during operation of image identification subsystem 220. In one embodiment, manual tagging subsystem allows such a user to review not only a single instance of such an ambiguous image, but multiple thumbnails of subsequent images in the book so that multiple similar images may be processed similarly. Likewise, those images with similar likely types and confidence levels (as discussed above) are in one embodiment presented together to the user for grouped processing. For purposes of assessment, the user may simply categorize the image(s) presented manually, performing for such ambiguous images similar processing to that performed automatically by image categorization subsystem 230. In some embodiments, manual tagging subsystem 260 further permits the user to replace an image (whether an ambiguous image or not) with whatever text the user believes to be most appropriate. In one typical scenario where it appears likely that the book will be converted to an audio version, the user could at this time also provide a textual description of the image pertinent to the audio version, such as, "A map of Middle Earth shows the path from Hobbiton, along the East-West Road through the Shire, the Old Forest, over the Last Bridge and on to Rivendell." Such processing, if not extensive, will save a step later should a decision be made to convert the book to audio, and may obviate the need to assign a weight to the image, as set forth in the following paragraphs. In another scenario, the user decides that the image need not be described or further processed, and simply ignores it by marking it as irrelevant.

Once the text and images of the book have been identified and processed as described above, weights are assigned to the images. In one embodiment, more weight corresponds to greater importance of the graphic to enjoyment of the book, such that it will be harder for a user to "live without" the graphic in an audio version. Those of the images that have been replaced with text are given low weight. In one embodiment, images are further processed to see if they correspond to "low value" subjects such as publishers' logos, other commercial logos and the like. Similarly, images that correspond with famous people, works of art, architectural works, and the like are discounted as likely already part of the user's mental imagery. For instance, an image of the Eiffel Tower in a fictional work set in Paris is not likely to be tremendously important, as anyone interested in the book likely already has a mental image of the Eiffel Tower.

More weight is provided to images that are identified as conveying factual information, such as diagrams with one or more pieces of text around them, or images identified as being near certain key words such as "figure," "chart," and "diagram." Even more weight may be provided to specific textual references near the image, for instance numerous references to "FIG. 14" in the text surrounding an image. Searches based on the text adjacent to an image may thus impact the weighting provided to the image.

Likewise, graphs can readily be identified by matching images against components of known types of graphs (e.g., "L" shaped axes intersecting at the lower left quadrant of the image and with significant white space elsewhere). Heuristics relating to placement, alignment and rotation of text are also used to determine whether an image is likely a graph. Again, the importance of such a graph to the book is further determined based on both caption text for the illustration and adjacent body text. To a degree, the more reference is made to the subject of the graph in the text, the more important it is. However, if a graph has an explanatory caption, or the surrounding text provides such explanation, the image of the graph itself is somewhat redundant. Thus, in one embodiment captions are identified, for instance by their position beside or below an image, either in the de facto layout observed in a traditional book that has been scanned, or in the layout specified in a fixed or flowing electronic book. Captions of significant length suggest that an audio version, in which the caption is presented, conveys a better sense of the image than a shorter caption.

Another weighting factor in some embodiments is the size of the image, with larger images considered more important than smaller ones. Not only the total number of square pixels (length×width) but the shape of the image can be considered—images that are very small in one dimension are not likely to be substantively important. As noted elsewhere, even the coding of the image can provide a clue to its importance—special layout instructions or positioning commands in electronic books may indicate a preference that an image always be displayed while in a particular portion of the book, suggesting that the content requires high print/content fidelity.

Still another factor is the presence of "alttext" in electronic books. For HTML and XHTML documents, an "alt" attribute providing "alt text" is a flag that the corresponding text can be rendered when the image to which it applies cannot be displayed. If the alttext for an image is extensive, when the audio version of the book is rendered there is already an alternative to the image available, so the importance of the image is less than if the alttext is missing or trivial (such as merely the image file name). Not only the quantity of the alttext, but the nature of the alttext as well (e.g., highly repetitive or not) provide clues to whether the alttext will provide a meaningful replacement for the image, and therefore impact the weighting of the image.

Based on the context of the book, the type of image also bears on its weight. For example, a black-and-white line drawing in a biography likely represents an artist's sketch of subject matter discussed in the biography and is given a low weighting, while a high resolution photograph in an art history book may well show an important detail of a painting and the image in that instance may warrant a high weighting. For electronic books, the nature of the encoding of images provides a related clue to image importance. If most of the images in the book are presented via low-quality, highly compressed JPEG encoding but a significant minority are instead provided in large, lossless PNG formats, more weighting is given to the latter.

Image weighting subsystem 260 also compares images throughout a book to look for repetition, and searches for repeating patterns within images as well. Many books contain decorative graphics, and if the same graphic, or very similar graphics, appear on multiple pages of a book, the weighting of these images is decreased.

In another aspect, if a large proportion of the images for a chapter appear near the beginning of the chapter, this suggests that they are less informative, and serve to introduce a topic treated in the text rather than to add to it. The weight of such images is also reduced.

Where a contiguous section of pages contains mostly graphics, these images are also weighted lower. Traditionally, grouping historical photographs and the like in books for ease of separating text-only and mixed text and image pages was done only when the images were not critical for understanding the text.

Once the processing of image weighting subsystem 260 is complete, scoring subsystem 270 generates an overall score for the value of the graphics in the book. In one embodiment, scoring subsystem 270 generates a weighted average of the following:

Relative amount of graphics. A measure of value for the extent of the graphic content is provided by taking the total weight of all the graphics and dividing that amount by the total number of words in the book. This measure takes into account that longer books may have more images.

Spacing of graphics. The median number of words between images provides a measure of how clustered the images are. Regularly spaced graphics (high median values) suggest heavy reliance on graphics throughout the book, while large gaps (low median values) imply that, overall, the graphics mean less.

Variance of graphic weights. Uniform weights (low variance) suggest that the images are relatively important to the book, while highly variable weights suggest that, overall, the images are not likely to be as important.

The term "electronic book" as used herein can apply not only to traditional books, but to other types of content as well, for instance a professor's lecture that may be reviewed in text transcript form on an electronic book reader or in audio form.

System Database

Figure 3:
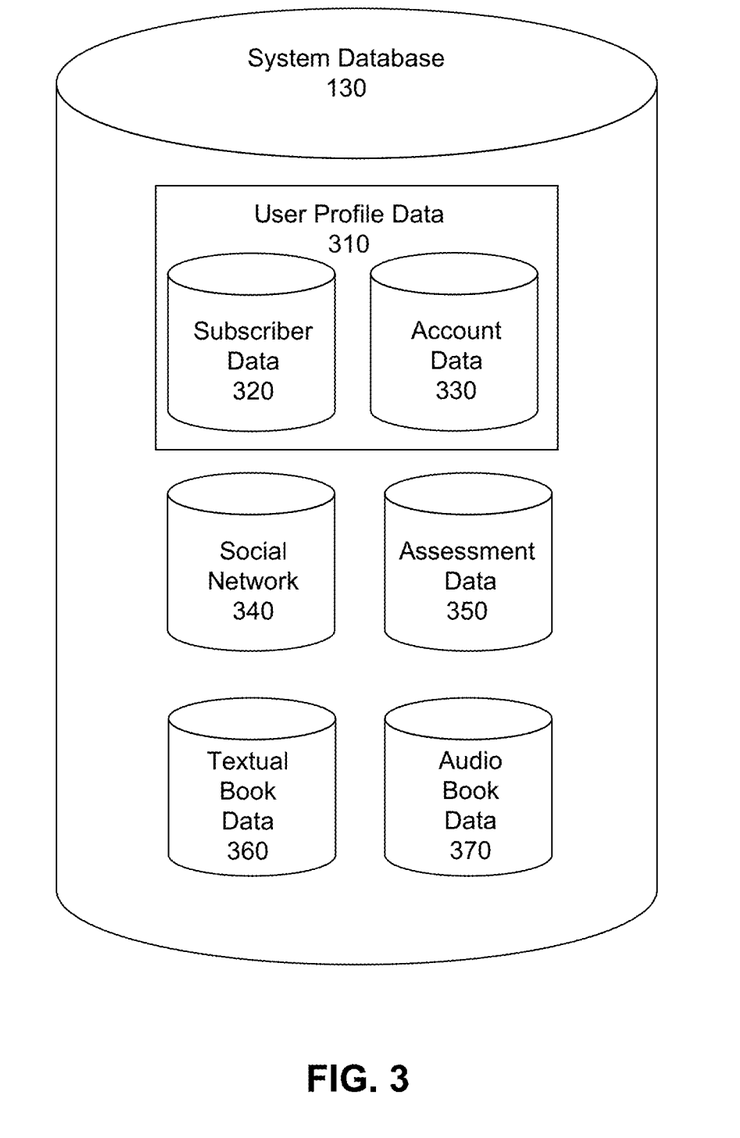
FIG. 3 illustrates a logical view of a system database that stores data and performs processing related to the operation of the assessment module.

FIG. 3 illustrates a functional view of the system database 130 that stores data related to the content hosting system 110. The system database 130 may be divided based on the different types of data stored within. This data may reside in separate physical devices, or may be collected within a single physical device. System database 130 in some embodiments also provides processing related to the data stored therein.

User profile data storage 310 includes information about an individual user, to facilitate the ordering, payment and collaborative aspects of system 100. Subscriber data storage 320 includes identifying information about the user. In some embodiments this is information provided by the user manually, while in other embodiments the user is given an opportunity to agree to the collection of such information automatically, e.g., the electronic books the user has obtained and the social network groups the user has joined. In some embodiments, subscriber data storage 320 also maintains information regarding how far the user has progressed in a particular book—in both text and audio versions. Just as known electronic reader systems (e.g., Google Books) synchronize the user's current reading location in a book so that the user can begin reading on a mobile device while on a bus and continue reading from the correct location on a desktop machine when at home, subscriber data storage 320 keeps track of progress of the user in text and audio versions of a book, and does so in a manner that is not solely local to one reading device.

Account data storage 330 keeps track of the user's payment mechanisms (e.g., Google Inc.'s CHECKOUT®) related to the user's ability to obtain content from system 100.

Social network 340 maintains in data storage devices the information needed to implement a social network engine to provide collaborative features, e.g., social graphs, social network preferences and rules that together facilitate communication among readers. In practice, it may be that various distributed computing facilities implement the social networking facilities and functions described herein. For example, certain existing features of the Google+ social networking facility can implement some of the functions of social network facility 340. Social network 340 will be used here to reference any facilities to implement the social networking functions discussed herein.

Assessment data storage 350 maintains information for features related to processing by assessment module 120, as discussed above. In some embodiments, this includes data relating to specific books (e.g., the tagged image text discussed above in connection with manual tagging subsystem 250, usage statistics, book ratings and reviews) and in some embodiments other information (e.g., files relating to publisher logo graphics as discussed above).

Textual book data storage 360 stores the actual textual content of a book, and in some embodiments related information as may be maintained (e.g., images and metadata regarding image content for portions of the book).

Audio book data storage 370 stores audio files for books that are converted to audio versions.

In various embodiments, system database 130 includes other data as well. For providers creating paid books or other content, system database 130 contains billing and revenue sharing information for the provider. Some providers may create subscription channels while others may provide single payment or free delivery of electronic books and related information. These providers may have specific agreements with the operator of the content hosting system 110 for how revenue will flow from the content hosting system 110 to the provider. These specific agreements are contained in the system database 130.

Alternatively, some providers may not have specific agreements with the operator of the content hosting system 110 for how revenue will flow from the content hosting service 110 to the provider. For these providers, system database 130 includes a standardized set of information dictating how revenue will flow from the content hosting system 110 to the providers. For example, for a given partner, the partner data may indicate that the content hosting system 110 receives 25% of the revenue for an item provided in both text-based and audio form as described herein, and the content provider receives 75%. Of course other more complex allocations can be used with variable factors based on features, user base, and the like.

Still further, system database 130 stores synchronization information regarding different versions of an electronic book. In one simple example, each of the textual book data storage 360 and the audio book data storage 370 are provided with metadata for synchronization purposes, for example a chapter count, page count or word count, depending on the level of synchronization desired.

In one embodiment, conventional mechanisms are used to implement many of the aspects of system database 130. For example, the existing mechanisms from Google Inc.'s BOOKS™ GOGGLES™ GMAIL™, BUZZ™, CHAT™, TALK™, ORKUT™, CHECKOUT™, YOUTUBE™, SCHOLAR™, BLOGGER™, GOOGLE+™ and other products include aspects that can help to implement one or more of storage facilities 310, 320, 330, 340, 350, 360 and 370 as well as modules 220, 230, 240, 250, 260 and 270. Google Inc. already provides eBook readers for ANDROID™ devices (phones, tablets, etc.), iOS devices (iPhones®, iPads®, and other devices from Apple, Inc.) and various desktop Web browsers, and in one embodiment GOOGLE PLAY EBOOKS™ and GOOGLE PLAY BOOKSTORE™ eBook-related applications and facilities are modified to provide the functionality described herein.

As mentioned above, user profile data storage 310 is usable on a per-reader basis and is also capable of being aggregated for various populations of subscribers. The population can be the entire subscriber population, or any selected subset thereof, such as targeted subscribers based on any combination of demographic or behavioral characteristics, or content selections. System-wide usage data includes trends and patterns in usage habits for any desired population. For example, correlations can be made between text versions of electronic books and requests for audio conversion made by purchasers of those books. In one embodiment, when a user obtains a new book, such data are used to recommend other related items the user might also be interested in obtaining (e.g., other books for which audio conversion suitability has been determined to be at least as good). Valuation of items, relative rankings of items, and other synthesized information can also be obtained from such data.

Computing Machine Architecture

FIG. 4 is a block diagram illustrating components of an example machine able to read instructions from a machine-readable medium and execute those instructions in a processor. Specifically, FIG. 4 shows a diagrammatic representation of a machine in the example form of a computer system 400 within which instructions 424 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes a processor 402 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 404, and a static memory 406, which are configured to communicate with each other via a bus 408. The computer system 400 may further include graphics display unit 410 (e.g., a plasma display panel (PDP), a liquid crystal display (LCD), a projector, or a cathode ray tube (CRT)). The computer system 400 may also include alphanumeric input device 412 (e.g., a keyboard), a cursor control device 414 (e.g., a mouse, a trackball, a joystick, a motion sensor, or other pointing instrument), a data store 416, a signal generation device 418 (e.g., a speaker), an audio input device 426 (e.g., a microphone) and a network interface device 420, which also are configured to communicate via the bus 408.

The data store 416 includes a machine-readable medium 422 on which is stored instructions 424 (e.g., software) embodying any one or more of the methodologies or functions described herein. The instructions 424 (e.g., software) may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 (e.g., software) may be transmitted or received over a network (not shown) via network interface 420.

While machine-readable medium 422 is shown in an example embodiment to be a single medium, the term "machine-readable medium" should be taken to include a single medium or multiple media (e.g., a centralized or distributed database, or associated caches and servers) able to store instructions (e.g., instructions 424). The term "machine-readable medium" shall also be taken to include any medium that is capable of storing instructions (e.g., instructions 424) for execution by the machine and that cause the machine to perform any one or more of the methodologies disclosed herein. The term "machine-readable medium" includes, but not be limited to, data repositories in the form of solid-state memories, optical media, and magnetic media.

Methods of Determining Suitability for Audio Conversion

The process of reading using electronic books opens up potential user experiences that have not been available in the world of paper books. Certain incentives to read can now be created that were not previously possible. Consider, for example, an electronic book implemented with both audio and text versions. Two valuable yet different uses are presented by such a book. First, a reader can both listen to the audio and follow the text of the book at the same time, either as an assistance to learning to read or to allow greater comprehension (e.g., by a student following both an audio version of a lecture and a corresponding textual transcription). Second, those who do not have sufficient time or desire to read a book in its text version can mix text-based traditional reading with audio presentation of the book's contents. As noted above, however, not all books are equally suited for conversion from a traditional (i.e., visual) presentation to an audio presentation.

Figure 5:
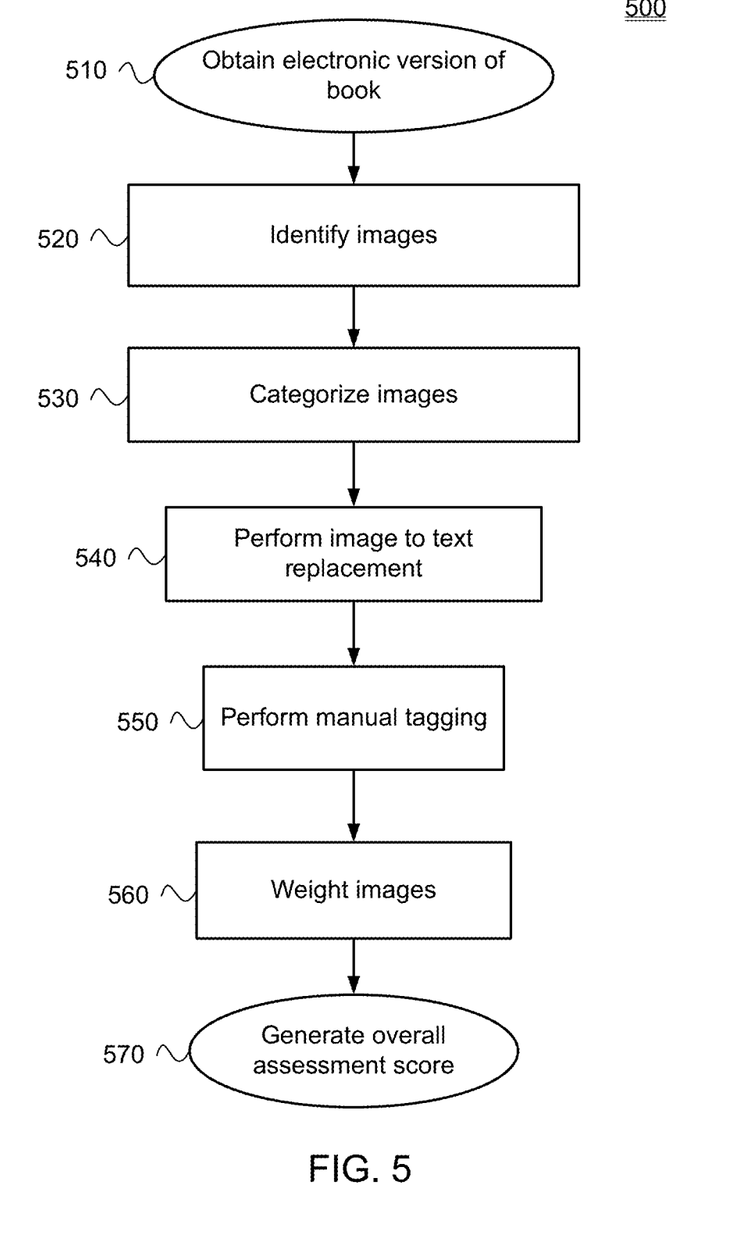
FIG. 5 illustrates one exemplary method of assessing suitability of a book for audio conversion.

Referring now to FIG. 5, there is shown one embodiment of a method to assess suitability of converting a book to audio form. In the example illustrated in FIG. 5, processing begins at step 510 by obtaining an electronic version of a book, for instance by scanning or by downloading an electronic book file. As noted above, in some embodiments the assessment is made by a content provider (e.g., the book publisher) while in others it is based upon request by one or more users for an audio version of the book.

At step 520, images in the electronic book are identified as discussed above in connection with operation of image identification subsystem 220.

Next, the images are categorized at step 530 as detailed above in connection with operation of image categorization subsystem 230.

Those images that correspond to text are then replaced with their text equivalents in step 540, as detailed in connection with operation of image replacement subsystem 240. As discussed in connection with manual tagging subsystem 250, ambiguous images are processed in step 550.

At that point, the images are weighted in step 560 in the manner described in connection with the operation of image weighting subsystem 260. Finally, an overall assessment score 570 is generated as described above in connection with scoring subsystem 270.

Those skilled in the art will recognize that in various embodiments, such processing methods and systems can be used by various parties in an advantageous manner. A prime example relates to publishers. Not only can publishers use the assessment scores to determine which books to market in audio form, they can also include in their advertising some indication that a book has been determined to be highly suitable for presentation in audio form. A publisher can differentially price audio books based on suitability scoring as well, charging more for those that are highly suited for audio presentation.

A publisher can further determine to provide, along with an audio version of a book, select images that are weighted as being highly valued (either included in the cost of the audio version or for an extra charge). These images can either be displayed on the audio-based reader (e.g., as a wallpaper or screen saver) or they can be provided in a form, such as a .pdf file, that the user can examine at some point while listening to the book, thereafter, or even before starting the book. As noted above, a publisher can also choose to include audio descriptions of certain images from the visual version of the book.

If marketplace demands do not justify a publishing house providing all books in audio form, the methods and systems disclosed herein allow the publishing house to determine which books do warrant audio version, or which books warrant manual review to determine suitability for conversion to audio form.

Customers can also make good use of the systems and methods disclosed herein. For example, customers can review assessment scores for the audio books they have listened to and determine for themselves what threshold level of assessment score is sufficient for them. Thereafter, before purchasing a new audio book the customers may compute or download the score for the new book and decide based on that whether to purchase the book in audio form. Customers may likewise assess books they already have in their library to see which ones are suitable for audio presentation, should they have electronic book readers that support audio presentation of the books already in their libraries.

Bookstores (whether on-line or physical) as well can help drive consumer demand for books they sell by displaying an "audio suitability" metric so that those who either require audio versions (e.g., visually impaired customers) or those who are merely inclined to audio versions (e.g, commuters) can use this information as a purchasing guide and increase their purchasing satisfaction.

Bookstores, publishers and consumers can also configure the assessment systems/methods disclosed herein to provide a user with thumbnails of the images with the highest value before the user decides to make a purchase. Not only does this allow the user to see what graphics will be most sorely missed, but it may also provide the user with enough of a sense of the image that further reference to the image during playback of the book will not be needed.

There are various other uses of the systems and methods described herein as well. In education, a child's electronic book reader may use information regarding richness of illustrations, generated as described herein, to determine whether a visual version of a book has sufficient graphical content to entice a young reader. Thus, even if no audio version of the book is ever made, the assessment score is still useful in determining attractiveness of a book for child readers. The addition of audio to such books can often enhance a child's experience in learning how to read, so weightings of books intended for children to experience in both print and audio versions (such as audio-narrated versions with corresponding visual displays) may be quite different than weightings of books that are expected to be listened to only, and not experienced in any visual manner.

In general, weighting strategies are adjusted in various environments based on numerous such factors. Books for preschoolers may be weighted completely differently than those for adolescent readers. Books to be converted to audio for the visually impaired may be weighted quite differently than those intended for those who might be able to quickly glance at an image on the reader (such as a picture of a primary character or scene) while experiencing the audio version of the book. In some cases an audio cue, such as a spoken cue, a beep, or a vibration is provided when playback of a book has reached a point where a new image is presented on the user device. In some environments, a cue may be presented telling the listener that an image corresponding to the current portion of the book is available for review on the web, and weightings allowing for such accommodations may be more forgiving of important images than weightings based on environments without them.

Publishers, bookstores, and readers can all undertake curation of such image presentation techniques in various embodiments. In some instances, customers are permitted to request a certain number of images, or thumbnails of images, to be included with a requested audio version. In other embodiments, users are allowed to vote as to which images should be included with an audio version; as a reward for such voting in one embodiment readers who vote are allowed to access more images, or to access images at a lower cost, than those who do not. Those skilled in the art will determine appropriate weighting schemes for each environment in which assessment is made. In some embodiments, known machine learning techniques are used to develop weighting parameters and image presentation suggestions based on user feedback over time.

Figure 6:
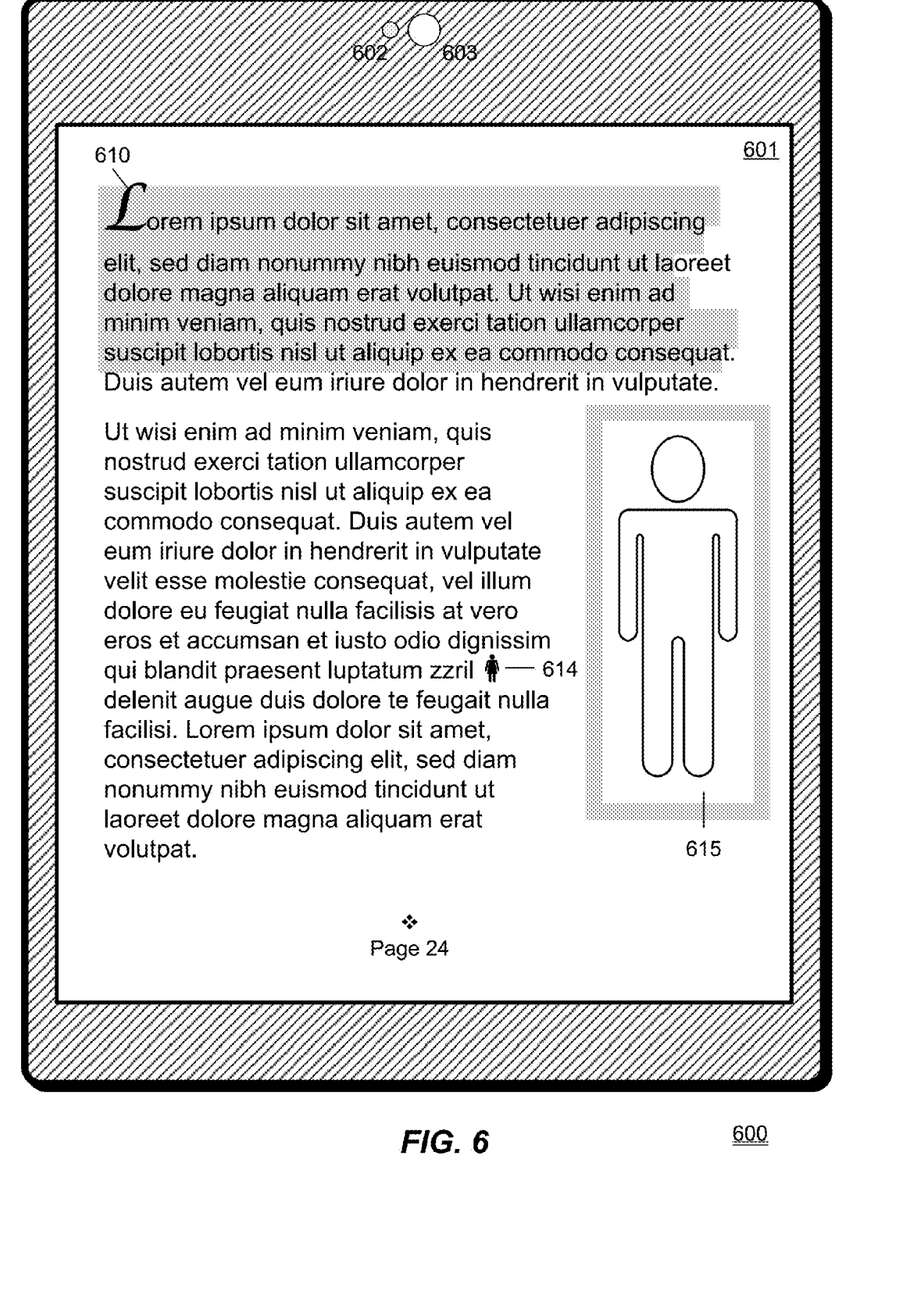
FIG. 6 illustrates a computer configured for presentation of audio and visual versions of an electronic book.

Referring now to FIG. 6, there is shown one embodiment of a portable computer device 600 (e.g., a tablet computer running the ANDROID™ operating system) with a display screen 601, a microphone 602, and a speaker 603, configured to allow presentation of visual and audio versions of books, as described herein. Screen 601 provides visual display, for instance of a visual version of a book or of images provided along with an audio version of a book. Microphone 602 provides, in certain embodiments, hands-free user control of device 600 via voice recognition. Speaker 603 provides audio output for the audio version of a book.

Device 600 is shown in FIG. 6 displaying a visual version of a book. In addition to the text that appears on screen 601, in this example there are several images to be processed during assessment as described above. The stylized leading capital letter "L" 601 is processed by text replacement as discussed in connection with image replacement subsystem 240. The small icon of a woman 614 is processed as a symbol or dingbat as described in connection with image categorization subsystem 230, as is the four-diamond symbol that appears above the page number. The large image of a man 615 is processed as generally described above. Should that image be weighted in a manner suggesting a very high value, it may be proposed as one of the images to be provided on the device 600 during audio playback. In the example shown in FIG. 6, the shaded text at the top of the display may be determined to correspond to the image 615, so in that instance when playback reaches the shaded text portion, the image 615 is displayed on device 600 and the listener may be prompted to look at the display to see image 615.

Generally speaking, the embodiments discussed above permit enhancement of a user experience with electronic media by assessing suitability of conversion of a book to an audio version and supporting some image presentation to augment the audio presentation, all using existing computing devices such as smart phones and electronic book readers.

It should be noted that although the discussion herein has centered on assessing conversion of books to audio versions, those skilled in the art will readily recognize that these techniques can be used to facilitate other possible conversions involving electronic media as well. For instance, a user may have access to the same electronic book on one type of reading device with a monochromatic display and on a second device that supports color presentation. Through use of the systems and methods disclosed herein, assessment of suitability of reading, on the monochromatic device, content intended for the color device, can readily be accomplished.

Additional Considerations

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for assessing suitability of audio conversion of books through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system to process graphical elements within a book during assessment of the book for suitability for conversion to an audio format, the system comprising:
   an image classification subsystem configured to classify a graphical element based on at least one of a context of the graphical element and properties of the graphical element;
   an image processing subsystem operably connected to the image classification subsystem and configured to process the graphical element to create a processed graphical element, the processing responsive to the classification of the graphical element; and
   a weighting subsystem operably connected to the image processing subsystem and configured to produce a weighting corresponding to the processed graphical element, the weighting indicating an impact of the graphical element of suitability of the book for conversion to the audio format.

2. The system of claim 1, wherein, responsive to the classification of the graphical element indicating the graphical element corresponds to text, the image processing system creates the processed graphical element by replacing the graphical element with corresponding text.

3. The system of claim 2, wherein the corresponding text is based on the context of the graphical element.

4. The system of claim 1, wherein the graphical element is a symbol without a corresponding Unicode character, the image processing subsystem is further configured to identify a nature of the symbol, and the processing of the graphical element is based on the nature of the symbol.

5. The system of claim 1, wherein the image processing subsystem is further configured to determine that the graphical element contains recognizable text and, responsive to an amount of the recognizable text exceeding a threshold, the image processing subsystem extracts the recognizable text from the graphical element and replaces the graphical element with the extracted text.

6. The system of claim 1, wherein image classification subsystem is further configured to classify a second graphical element as a dingbat and the weighting subsystem is further configured to apply a weighting of zero to the second graphical element responsive to the classification of the second graphical element as a dingbat.

7. The system of claim 6, wherein the classification of the second graphical element as a dingbat is based on at least one of: a pixel area of the second graphical element; repetition of the dingbat throughout the book; a degree of complexity of the second graphical element; and recognition of the second graphical element as a dingbat by an OCR engine.

8. A method of processing graphical elements within a book during assessment of the book for suitability for conversion to an audio format, the method comprising:
   classifying a graphical element based on at least one of a context of the graphical element and properties of the graphical element;
   processing the graphical element to create a processed graphical element, the processing responsive to the classification of the graphical element; and
   producing a weighting corresponding to the processed graphical element, the weighting indicating an impact of the graphical element of suitability of the book for conversion to the audio format.

9. The method of claim 8, wherein the processing comprises, responsive to the classifying indicating the graphical element corresponds to text, replacing the graphical element with corresponding text.

10. The method of claim 9, wherein the corresponding text is based on the context of the graphical element.

11. The method of claim 8, wherein the graphical element is a symbol without a corresponding Unicode character, the method further comprises identifying a nature of the symbol, and the processing of the graphical element is based on the nature of the symbol.

12. The method of claim 8, wherein the processing comprises determining that the graphical element contains recognizable text and, responsive to an amount of the recognizable text exceeding a threshold, extracting the recognizable text from the graphical element and replacing the graphical element with the extracted text.

13. The method of claim 8, further comprising classifying a second graphical element as a dingbat and applying a weighting of zero to the second graphical element responsive to the classification of the second graphical element as a dingbat.

14. The method of claim 8, wherein the classification of the second graphical element as a dingbat is based on at least one of: a pixel area of the second graphical element; repetition of the dingbat throughout the book; a degree of complexity of the second graphical element; and recognition of the second graphical element as a dingbat by an OCR engine.

15. A non-transitory computer-readable medium storing instructions for processing graphical elements within a book during assessment of the book for suitability for conversion to an audio format, the instructions when executed by a computer processor cause the computer processor to:
   classify a graphical element based on at least one of a context of the graphical element and properties of the graphical element;
   process the graphical element to create a processed graphical element, the processing responsive to the classification of the graphical element; and
   produce a weighting corresponding to the processed graphical element, the weighting indicating an impact of the graphical element of suitability of the book for conversion to the audio format.

16. The non-transitory computer-readable medium of claim 15, wherein the processing comprises, responsive to the classifying indicating the graphical element corresponds to text, replacing the graphical element with corresponding text.

17. The non-transitory computer-readable medium of claim 16, wherein the corresponding text is based on the context of the graphical element.

18. The non-transitory computer-readable medium of claim 15, wherein the graphical element is a symbol without a corresponding Unicode character, the instructions further cause the computer processor to identify a nature of the symbol, and the processing of the graphical element is based on the nature of the symbol.

19. The non-transitory computer-readable medium of claim 15, wherein the processing comprises determining that the graphical element contains recognizable text and, responsive to an amount of the recognizable text exceeding a threshold, extracting the recognizable text from the graphical element and replacing the graphical element with the extracted text.

20. The non-transitory computer-readable medium of claim 15, wherein the instructions further cause the computer processor to classify a second graphical element as a dingbat and apply a weighting of zero to the second graphical element responsive to the classification of the second graphical element as a dingbat.

\* \* \* \* \*